United States Patent
Maeda et al.

[19]

[11] Patent Number: 6,072,366
[45] Date of Patent: Jun. 6, 2000

[54] RECEIVER CAPABLE OF OUTPUTTING A HIGH QUALITY SIGNAL WITHOUT REGARD TO AN INPUT SIGNAL LEVEL

[75] Inventors: Masaaki Maeda, Tokyo; Zenkichi Sekine, Nagoya, both of Japan

[73] Assignee: Oki Electric Industry Co., Ltd., Tokyo, Japan

[21] Appl. No.: 09/325,646

[22] Filed: Jun. 4, 1999

[30] Foreign Application Priority Data

Jun. 10, 1998 [JP] Japan ................................. 10-161892

[51] Int. Cl.[7] .............................. H03F 3/45; H03F 3/08; H01J 40/14
[52] U.S. Cl. ..................... 330/254; 330/308; 250/214 A
[58] Field of Search .................................. 330/254, 308; 250/214 A, 214 AG; 359/189

[56] References Cited

U.S. PATENT DOCUMENTS

| | | | |
|---|---|---|---|
| 5,430,765 | 7/1995 | Nagahori | 330/259 |
| 5,646,560 | 7/1997 | Nguyen | 330/288 |
| 5,907,261 | 5/1999 | Jones | 330/254 |

FOREIGN PATENT DOCUMENTS 61-200709  9/1986  Japan .

OTHER PUBLICATIONS

R.G. Swartz et al. "Electronics for High Speed, Burst Mode Optical Communications", International Journal of High Speed Electronics, vol. 1, Nos. 3&4, pp. 223–243, 1990.

Primary Examiner—Benny Lee
Assistant Examiner—Patricia T. Nguyen
Attorney, Agent, or Firm—Rabin & Champagne, P.C.

[57] ABSTRACT

A receiver includes a first amplifying circuit for amplifying an input signal to thereby output an amplified input signal. A reference voltage generating circuit has the same configuration as the first amplifying circuit and generates a reference signal having a reference voltage for the amplified input signal. A variable-gain amplifying circuit variably adjusts the gain of the level of a signal derived from the amplified input signal and reference signal. The variable-gain amplifying circuit includes a second amplifying circuit for amplifying the amplified input signal and reference signal for maintaining linearity to thereby output a pair of first differential signals and a pair of second differential signals having shifted levels. A first differential amplifier performs differential amplification based on the first differential signals. A second differential amplifier performs differential amplification based on the first differential signals with a higher gain than the first differential amplifier. A gain controller controls, based on the second differential signals, the gains of the first and second differential amplifiers with a control signal capable of varying gain allocation to said the two differential amplifiers. When the amplified input signal has an amplitude far greater than the reference signal, the gain controller causes a current to flow through only one of the two differential amplifiers. When the amplified input signal has an amplitude far smaller than the reference signal, the gain controller causes the two differential amplifiers to operate at the same time.

13 Claims, 14 Drawing Sheets

RECEIVER CAPABLE OF OUTPUTTING A HIGH QUALITY SIGNAL WITHOUT REGARD TO AN INPUT SIGNAL LEVEL

BACKGROUND OF THE INVENTION

1. Field of the Invention

The present invention relates to a receiver capable of outputting a high quality signal without regard to the level of an input signal. More particularly, the present invention relates to, e.g., an optical receiver included in an optical communication system and capable of amplifying the level of a signal derived from a received optical signal to a desired level. The receiver of the present invention is adaptive even to burst signals and may handle electric signals in place of optical signals.

2. Description of the Background Art

An optical receiver, for example, includes a light-sensitive device for converting a received optical signal to an electric signal and amplifies the electric signal. A prerequisite with the optical receiver is that its output includes a minimum of noise and has a broad dynamic range, a broad frequency band, and a high gain. Another prerequisite is that the receiver can be easily interfaced to a device to follow.

Japanese patent laid-open publication No. 200709/1986, for example, discloses a pre-amplifier for optical communication as an amplifier meeting the above prerequisites. In this pre-amplifier, a differential amplifier has one of its two input terminals connected to the output of a transimpedance amplifier that amplifies the output of a light-sensitive device. The other input of the differential amplifier is connected to the output of a reference voltage generating circuit identical in configuration with the transimpedance amplifier with respect to DC. The pre-amplifier with such a construction and connection is applied to, e.g., an optical receiver for an optical communication system.

In an optical communication system, a transmitter of the type directly modulating the intensity of light in accordance with data and sending the data in the form of a pulse beam is conventional. This type of transmitter transforms an input electric pulse signal to an optical pulse signal or pulse beam.

Assume that the transmitter outputs an optical signal $P_s$ when a pulse signal representative of data is present or outputs an optical signal $P_b$ when it is absent. The optical signal $P_b$ is derived from, e.g., a dark current flowing through a light emitting section and representative of the DC offset component of a signal. The signal $P_s$ contains the signal $P_b$. The signal output from the transmitter has a characteristic determined in terms of, e.g., a ratio of the signal $P_s$ to the signal $P_b$ generally referred to as an extinction ratio. In the optical communication system, optical signals with such a characteristic are interchanged. The transmission system required to send and receive high quality signals at a high speed is usually constructed to maintain the offset component small enough to guarantee acceptable transmission quality.

When the pre-amplifier mentioned earlier is applied to a low cost, simple optical communication system, the above extinction ratio directly appears in the received signal as an offset voltage input to the differential amplifier. Moreover, when a differential amplifier with a high output gain is used, and if an input signal has an extremely high level, the amplifier fails to linearly amplify the input signal and thereby limits the output amplitude, i.e., causes the output to saturate, as well known in the art. It follows that the pre-amplifier received the signal in the above condition undesirably raises the lower limit, i.e., DC voltage level by amplification due to the input offset voltage. Consequently, the saturation level limits the upper limit of the amplitude level and thereby causes the amplitude range of the output signal to be practically lost.

Further, when the differential amplifier has a low gain and receives an input signal having an extremely low level, it cannot amplify the input signal to a sufficient degree. In this manner, the dynamic range of the output signal is reduced when the input signal has an extremely high level or an extremely low level.

In light of the above, a differential amplifier for the above application is usually implemented by a variable-gain amplifier capable of varying its gain in accordance with the level of an input signal. Specifically, a variable-gain amplifier has its gain reduced when the input signal has an excessively high level or has the gain increased when it has an excessively low level, thereby guaranteeing a linear dynamic range. To set the gain of the variable-gain amplifier, an input signal is first sampled in order to hold and determine the peak of the signal. Then, a gain control signal for optimizing the dynamic range on the basis of the peak is fed to the amplifier in the form of a DC voltage. As a result, the gain of the amplifier is automatically controlled (so-called automatic gain control or AGC).

However, the above AGC processing is not practicable unless it samples the continuously input signal for a certain period of time. The AGC processing is therefore not feasible for an optical communication system involving a time constant, e.g., PDS (Passive Double System) or PON (Passive Optical Network) handling burst signals which must not lose any data. This is because a receiver included in this kind of system must accurately receive all the data without any loss despite that signals are irregularly input to the variable-gain amplifier as to timing and have different levels.

In recent years, optical transmission dealing with burst signals has been studied and disclosed in, e.g., R. G. Swartz et al. "Electronics for High Speed, Burst Mode Optical Communications", International Journal of High Speed Electronics, Vol. 1, Nos. 3 & 4, pp. 223–243, 1990. This document describes a concept relating to the burst mode of an optical communication system as well as differences particular thereto, and proposes a new solution using high speed, high accuracy peak detection.

Another problem with the pre-amplifier for optical communications is that its output signal is distorted when ringing occurs in the transimpedance amplifier. Digital data produced from the distorted signal would include bit errors.

Moreover, the sensitivity of the pre-amplifier is determined by a noise current in terms of an input. To produce a noise current in terms of an input, the noise current of a reference voltage generator built in the pre-amplifier and that of the transimpedance amplifier each are squared and then averaged, and the resulting mean squares are summed. It follows that sensitivity available with the pre-amplifier is too low to realize a high sensitivity optical receiver.

SUMMARY OF THE INVENTION

It is therefore an object of the present invention to provide a high sensitivity receiver capable of broadening the dynamic range of an input signal without regard to the level of the input signal, and insuring high signal quality even when handling burst signals.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Preferred embodiments of the receiver in accordance with the present invention will be described hereinafter. The present invention is characterized in that it amplifies a signal in consideration of the level of an input signal and is adaptive even to burst signals. The embodiments to be described each are implemented as an optical receiver for optical communication by way of example.

First Embodiment

Figure 1:
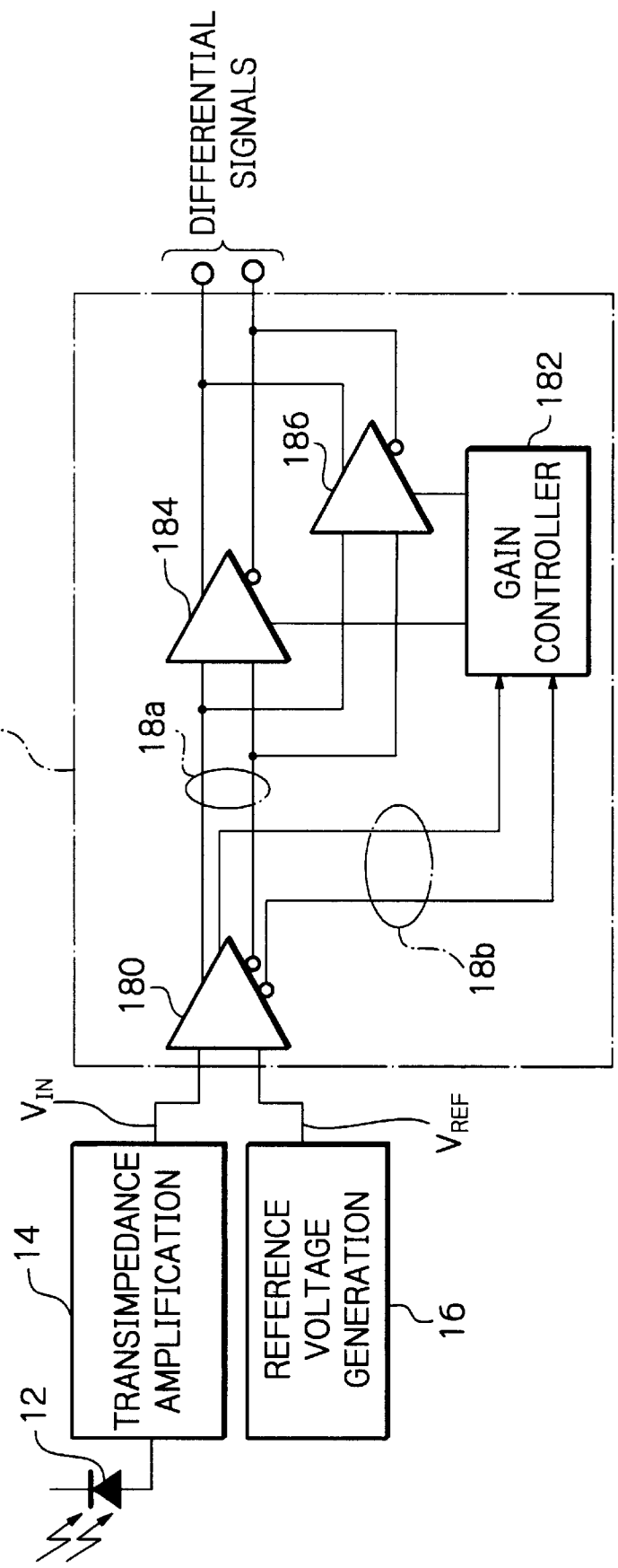
FIG. 1 is a block diagram schematically showing a first embodiment of the receiver in accordance with the present invention.

Referring to FIG. 1 of the drawings, an optical receiver, generally 10 is generally made up of a light-sensitive device 12, a transimpedance amplification 14, a reference voltage generation 16, and a variable-gain amplifying section 18.

An optical transmitter, not shown, modulates the intensity of light with, e.g., encoded digital data and sends the modulated light, or optical signal, to the light-sensitive section 12. Particularly, the optical signal is represented by the turn-on and turn-off of light corresponding to digital data represented by bit-by-bit pulses. The light-sensitive device 12 is a photoelectric transducer for converting the optical signal to an electric signal in accordance with the quantity of incident light. In the illustrative embodiment, the light-sensitive device 12 is implemented by an avalanche photodiode capable of transforming a small quantity of light to an intense electric signal. Therefore, the electric signal output from the photosensitive-element is a current.

The transimpedance amplification 14 is a converter for converting a current I to a voltage V. The transimpedance amplification 14 will sometimes be referred to as an impedance converter because it converts an input signal of low impedance to an output signal of desired high impedance. The amplification 14 feeds the received signal to the variable-gain amplifying section 18.

The reference voltage generation 16 has, in the DC aspect, substantially the same configuration as the transimpedance amplification 14 and generates a reference voltage $V_{REF}$. The reference voltage $V_{REF}$ is fed from the reference voltage generation 16 to the variable-gain amplifying section 18. So long as a signal is not input to the transimpedance amplification 14, the reference voltage $V_{REF}$ is a voltage corresponding to the DC voltage of the amplification 14.

The variable-gain amplifying section 18 includes an input buffer 180, a gain controller 182, and differential amplifiers 184 and 186. The input buffer 180 receives the reference voltage $V_{REF}$ from the reference voltage generation 16 and receives an input signal $V_{IN}$ from the transimpedance amplification 14. The input buffer 180 is a linear amplifier having a gain smaller than 1 set therein.

Figure 2:
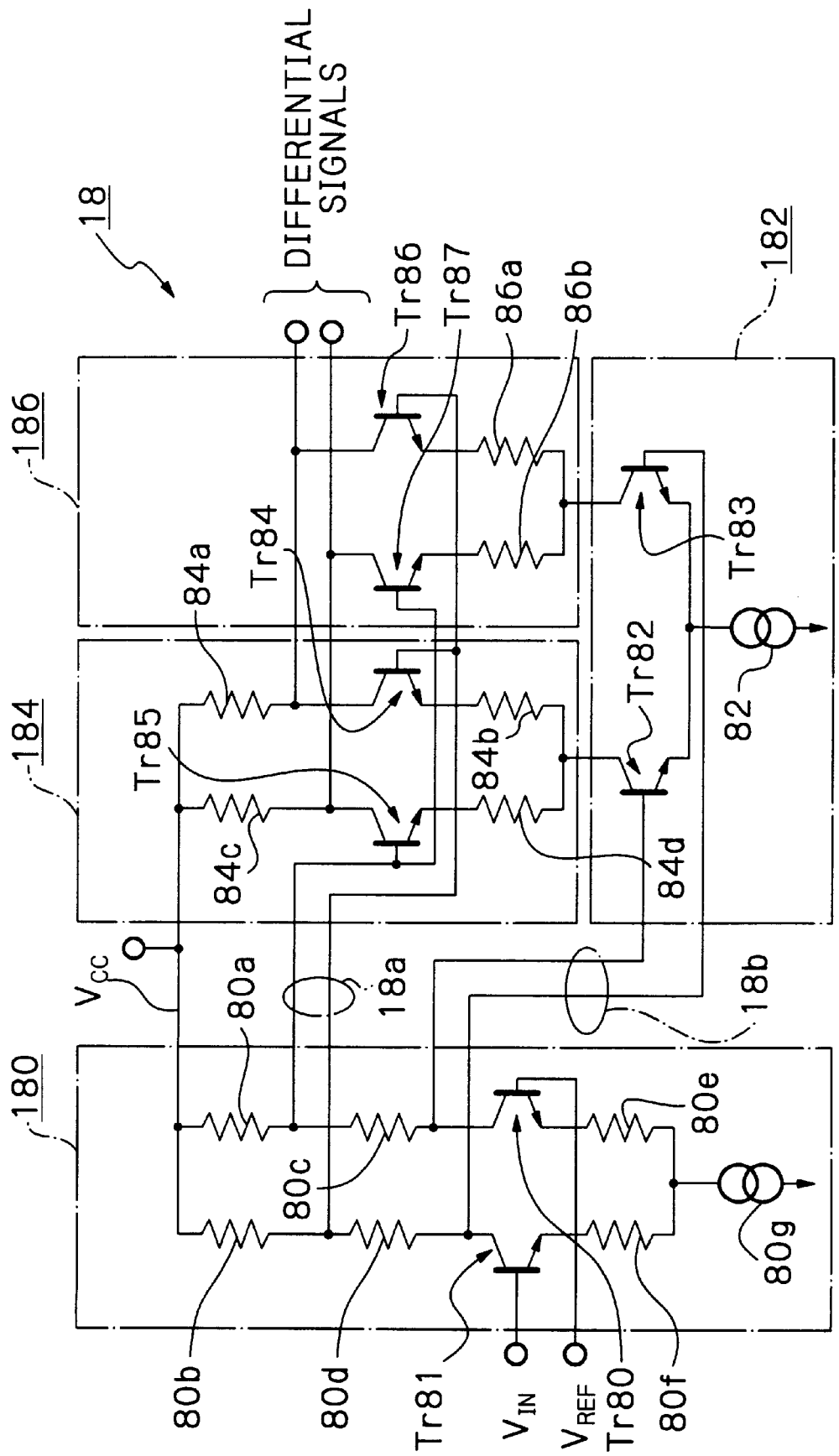
FIG. 2 is a circuit diagram showing a specific configuration of a variable-gain amplifying section included in the first embodiment.

A specific configuration of the variable-gain amplifying section 18 including the above input buffer 180 will be described with reference to FIG. 2. As shown, the input buffer 180 includes resistors 80a and 80b each having one end connected to a terminal $V_{cc}$ included in a power supply line. The other ends of the resistors 80a and 80b are connected to resistors 80c and 80d, respectively. The resistors 80c and 80d are connected to the collector of a transistor Tr80 and the collector of a transistor TR81, respectively. A constant current source 80g is connected to the emitters of the transistors Tr80 and Tr81 via resistors 80e and 80f, respectively.

With the above configuration, the input buffer 180 outputs two pairs of differential signals, i.e., a pair of positive or non-inverted signals and a pair of negative or inverted signals. Specifically, first outputs 18a which are one pair of differential signals respectively appear between the resistors 80a and 80c and between the resistors 80b and 80d. The first outputs 18a are usual differential signals output from the input buffer 180 whose gain is smaller than 1. Therefore, despite that the signal input to the input buffer 180 has a level varying over a broad range, i.e., from an extremely low level to an extremely high level, the input buffer 180 is operable in the linear range at all times. Second outputs 18b which are the other pair of differential signals respectively appear between the end of the resistor 80c and the collector of the transistor Tr80 and between the end of the resistor 80d and the collector of the transistor Tr81. The second outputs 18b are fed to the gain controller 182 as a pair of differential signals multiplied by a greater gain than the first outputs 18a by the input buffer 180.

The gain controller 182 is so constructed as to distribute a current evenly to the differential amplifiers 184 and 186. As shown in FIG. 2, in the illustrative embodiment, the gain controller 182 is implemented by transistors Tr82 and Tr83 and a constant current source 82. The transistors Tr82 and Tr83 have their collectors connected to the differential amplifiers 184 and 186, respectively. The second outputs 18b of the input buffer 180 are fed to the bases of the transistors Tr82 and Tr83, respectively. The emitters of the transistors Tr82 and Tr83 are commonly connected to the constant current source 82.

The differential amplifiers 184 and 186 each are made up of a pair of transistors and a plurality of resistors.

Specifically, the differential amplifier 184 has transistors Tr84 and Tr85 and resistors 84a–84d while the differential amplifier 186 has transistors Tr86 and Tr87 and resistors 86a–86b. The differential amplifiers 184 and 186 each output one differential via a line connecting a junction between the collector of the transistor Tr84 and the resistor 84a and the collector of the transistor Tr86. Also, the differential amplifiers 184 and 186 each output the other differential via a line connecting a junction between the transistor Tr85 and the resistor 84c and the collector of the transistor Tr87.

The operation of the optical receiver 10 will be briefly described hereinafter. The light-sensitive device 12 transforms incident light to a corresponding current and feeds it to the transimpedance amplification 14. The transimpedance amplification 14 converts the input current to a voltage $V_{IN}$ and inputs the voltage $V_{IN}$ to one input of the input buffer 180 included in the variable-gain amplifying section 18. The reference voltage generation 16 delivers the reference voltage $V_{REF}$ to the other input of the input buffer 180. The reference voltage $V_{REF}$ fixes the level of the output signal of the input buffer 180 at the DC level to hold when no signals are input to the transimpedance converter 14.

The input buffer 180 delivers to the differential amplifiers 184 and 186 one of two results of differential amplification, i.e., a pair of non-inverted and inverted signals or first outputs 18a derived from the gain of less than 1. In the differential amplifiers 184 and 186, the first outputs 18a are respectively applied to the bases of the transistors Tr84 and Tr86 and the bases of the transistors Tr85 and Tr87. Further, the input buffer 180 delivers its second outputs 18b amplified by a gain greater than the gain of the first outputs 18a to the gain controller 182. The second outputs 18b are respectively applied to the bases of the transistors Tr82 and Tr83. The transistors Tr82 and Tr83 therefore operate in accordance with voltages applied to their bases, respectively. The emitters of the transistors Tr82 and Tr83 both are connected to the constant current source 82, as stated earlier.

Figure 3A:
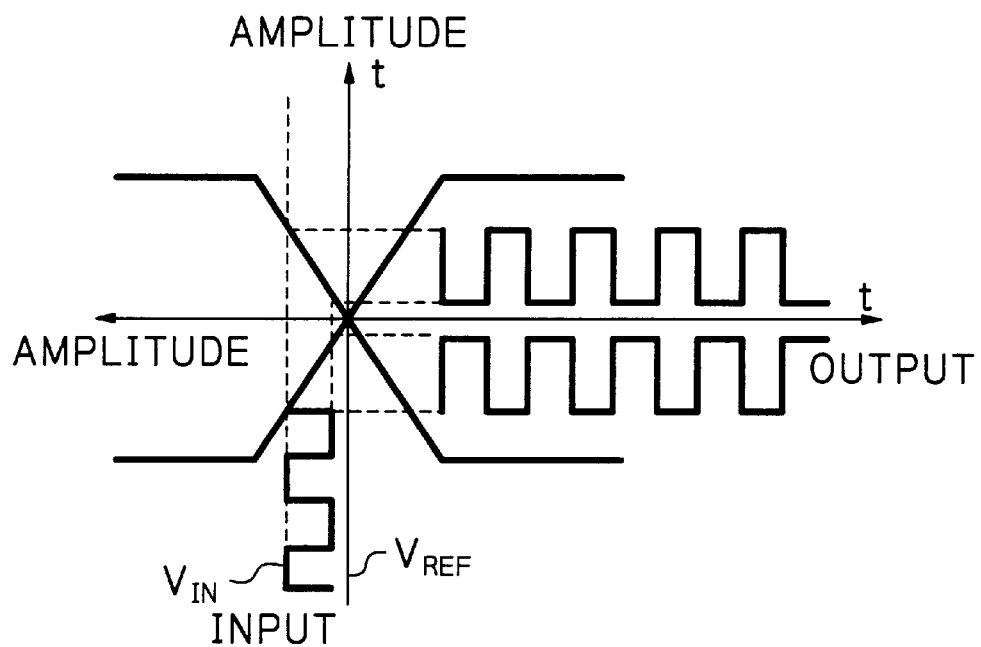
FIGS. 3A and 3B each show a relation between signals input to and output from the variable-gain amplifying section in a particular condition.
Figure 3B:
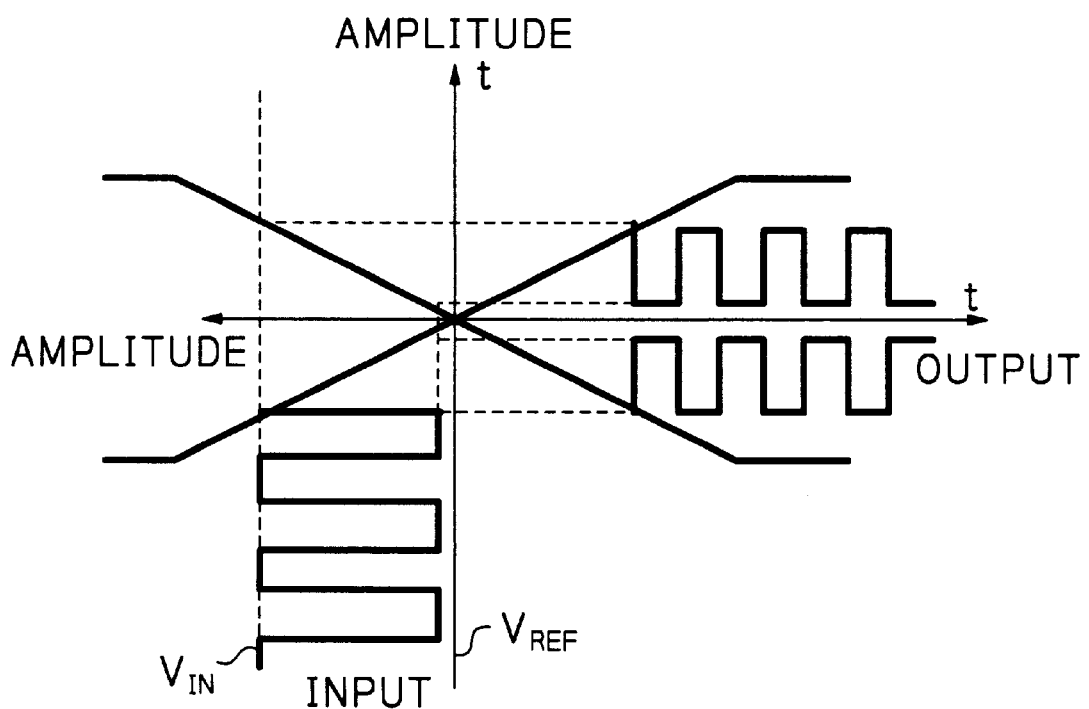

As the above connection indicates, the gain controller 182 is capable of adjusting the gains by varying the allocation of a constant current $I_o$. For example, as shown in FIG. 3A, assume the input signal $V_{IN}$ fed to the input buffer 180 has a low level. Then, the gain controller 182 allocates the constant current $I_o$ evenly to the differential amplifiers 184 and 186 ($I_o/2$). On the other hand, when the input signal $V_{IN}$ has an extremely high level, as shown in FIG. 3B, the gain controller 182 allocates the entire constant current $I_o$ to only one of the differential amplifiers 184 and 186. Further, in the illustrative embodiment, the differential amplifier 186 is provided with a gain $g_2$ higher than a gain $g_1$ assigned to the differential amplifier 184 beforehand. If desired, the gain $g_1$ may be selected to be higher than the gain $g_2$, in which case the connection of a bias will be varied accordingly.

Under the above gain control of the gain controller 182, the differential amplifiers 184 and 186 selectively increase or decrease the output level of the receiver 10 in accordance with the input signals $V_{IN}$ and $V_{REF}$. Specifically, if the input signal $V_{IN}$ is far lower in level than the reference signal $V_{REF}$, then the collector outputs of the transistors Tr86 and Tr84 are combined to produce a positive gain (see FIG. 3A). If the level of the input signal $V_{IN}$ is far higher than the reference signal $V_{REF}$, then a negative gain is produced (see FIG. 3B). Stated another way, a signal to be output is amplified when the input signal level is low or attenuated when it is high.

The gain of the variable-gain amplifying section 18 is therefore adjusted in accordance with the level of the input signal without resorting to peak detection. This successfully prevents, with a simple configuration, the amplitude of the input signal $V_{IN}$ from being lost even when the signal $V_{IN}$ has an excessive level. Even when the input signal $V_{IN}$ is a burst signal, it is possible to amplify the burst signal or data bit by bit. In addition, the DC level of the output signal can be maintained low enough to guarantee a sufficient dynamic range at the time of amplification.

Second Embodiment

Figure 4:
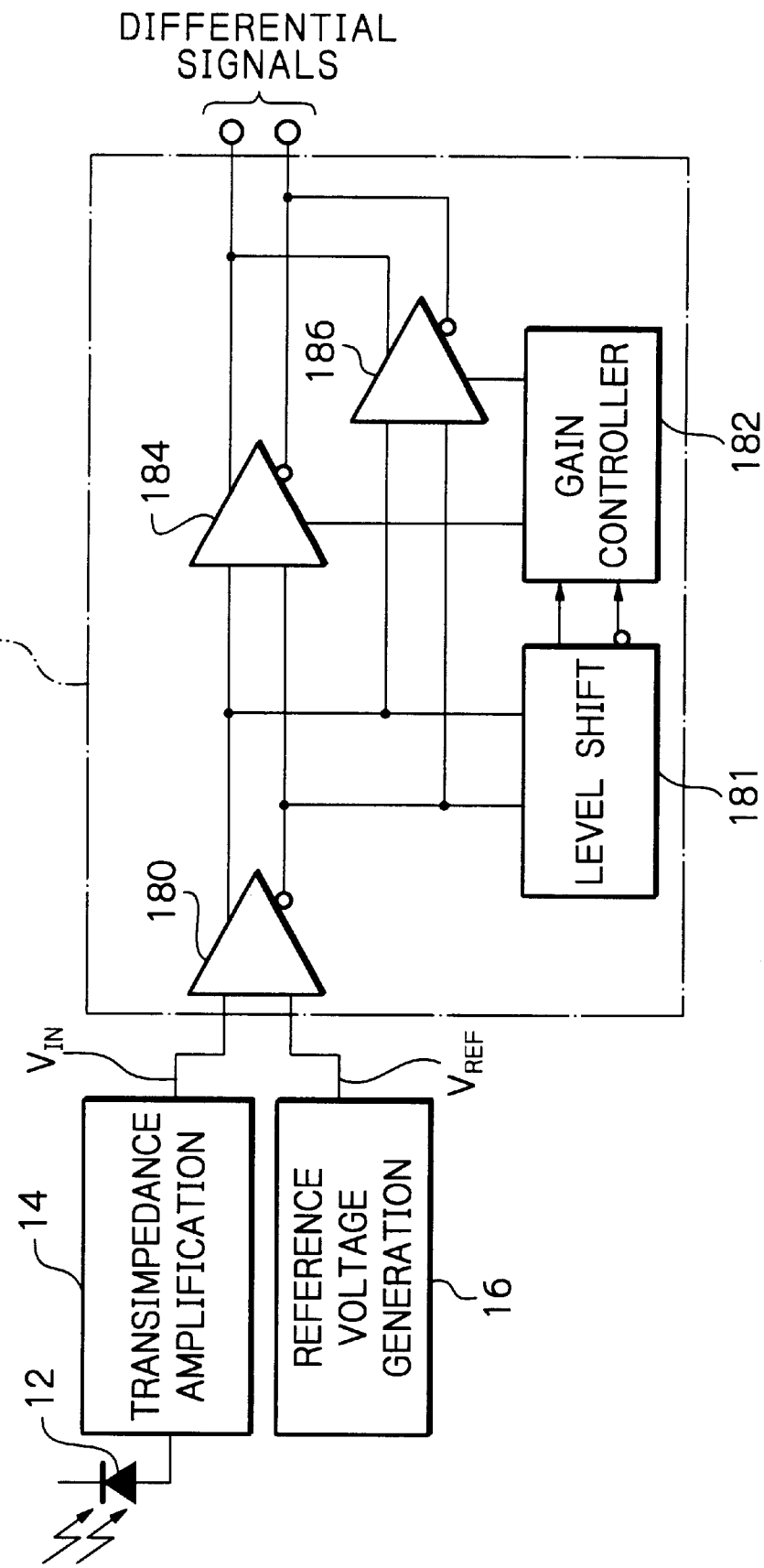
FIG. 4 is a schematic block diagram showing a second embodiment of the present invention.
Figure 5:
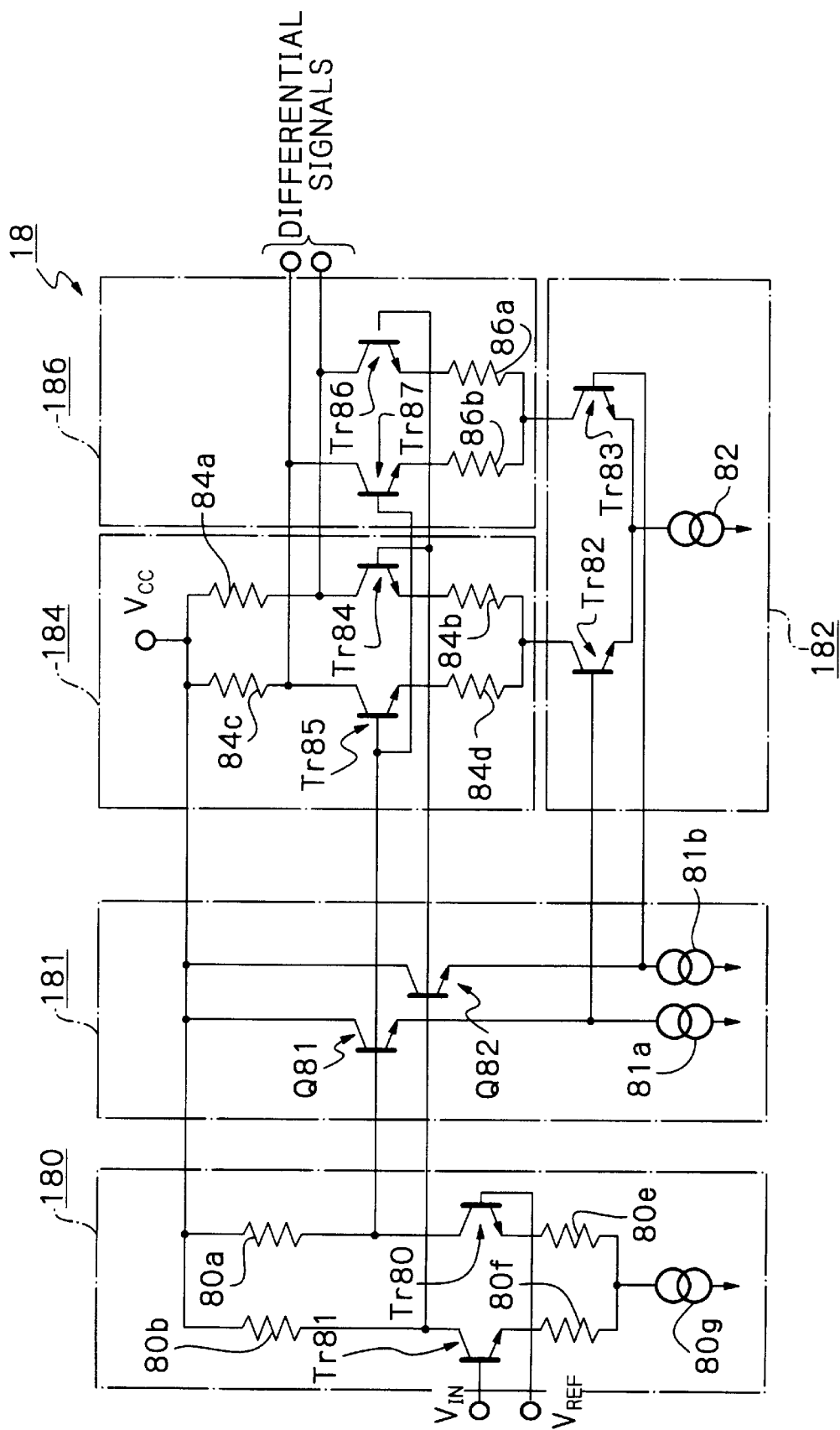
FIG. 5 is a circuit diagram showing a specific configuration of a variable-gain amplifying section included in the second embodiment.

Reference will be made to FIGS. 4 and 5 for describing a second embodiment of the optical receiver in accordance with the present invention. In FIGS. 4 and 5, structural elements identical with the structural elements shown in FIGS. 1 and 2 are designated by like reference numerals, and a detailed description thereof will not be made in order to avoid redundancy. As shown in FIG. 4, the optical receiver 10 includes a level shift 181 in addition to the light-sensitive device 12, transimpedance amplification 14, reference voltage generation 16, and variable-gain amplifying section 18. The level shift 181 is included in the variable-gain amplifying section 18 for shifting a DC level. In the illustrative embodiment, the input buffer 180 feeds a pair of differential signals to each of the level shift 181 and differential amplifiers 184 and 186.

As shown in FIG. 5, the level shift 181 includes transistors Q81 and Q82. The transistors Q81 and Q82 have collectors commonly connected to the power supply line and have emitters connected to constant current sources 81a and 81b, respectively. The outputs of the transistors Q81 and Q82 are respectively fed from the emitters to the bases of the transistors Tr82 and Tr83 of the gain controller 182 as a bias. This configuration is generally referred to as an emitter-follower circuit. The transistors Q81 and Q82 each operate in accordance with a signal input to its base from the input buffer 180 and directly delivers a DC component to the gain controller 182. Stated another way, the level shift 181 outputs any desired voltage identical in phase with the input at all times without being effected by a load resistance.

It has been customary with an optical receiver to, e.g., detect a peak in order to amplify an input signal in consideration of the level of the input signal and execute AGC in accordance with the detected peak. By contrast, the illustrative embodiment does not need any capacitive electronic part essential with the conventional AGC for setting a time constant essential for peak detection and is therefore simple in construction and low cost. Moreover, the illustrative embodiment is capable of dealing with burst signals. In addition, the illustrative embodiment broadens the dynamic range by effecting amplification in accordance with the input signals $V_{IN}$ and $V_{REF}$ on the basis of the relation shown in FIGS. 3A and 3B.

Figure 6:
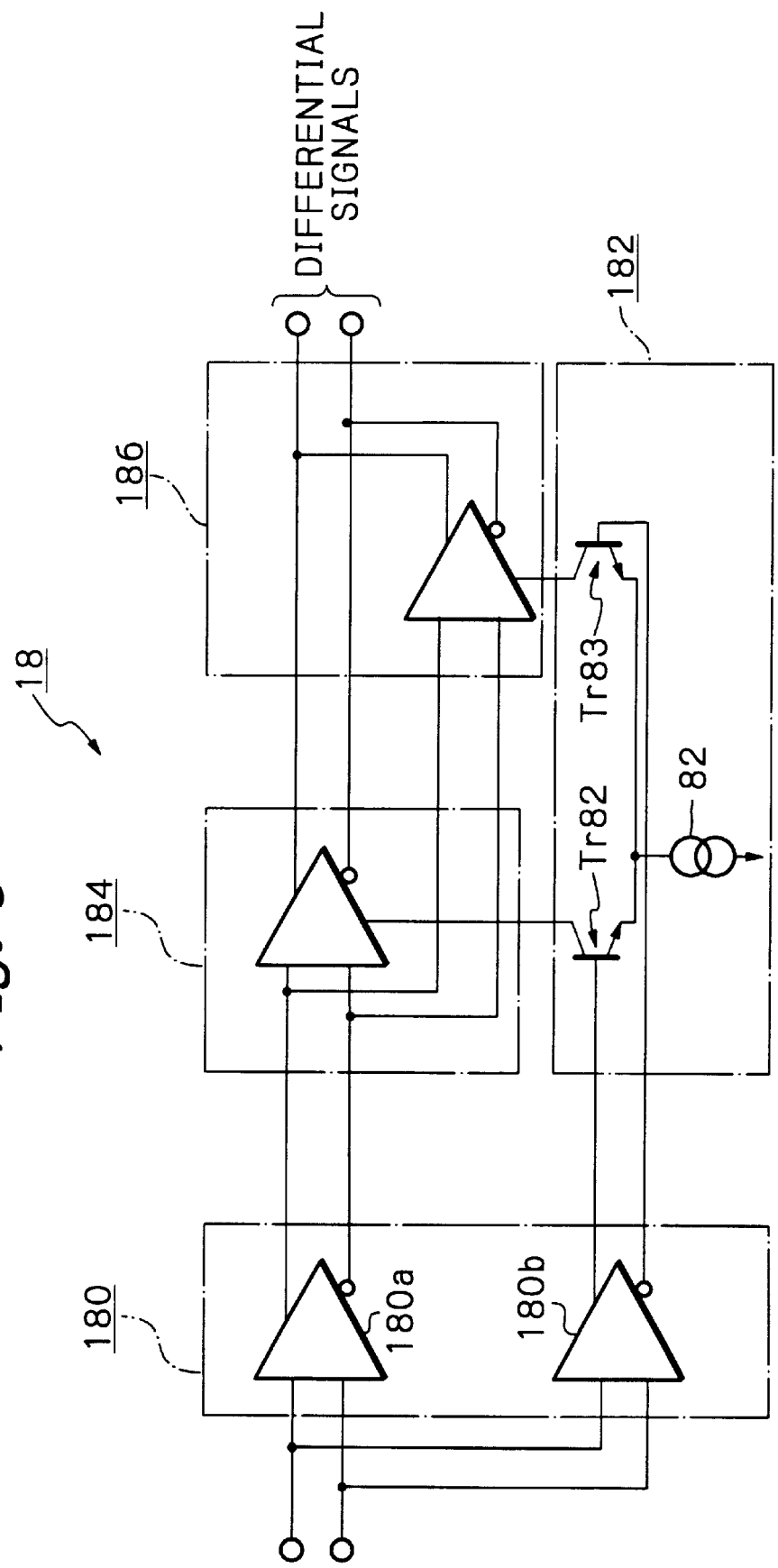
FIG. 6 is a schematic block diagram showing a first modification of the second embodiment.
Figure 7:
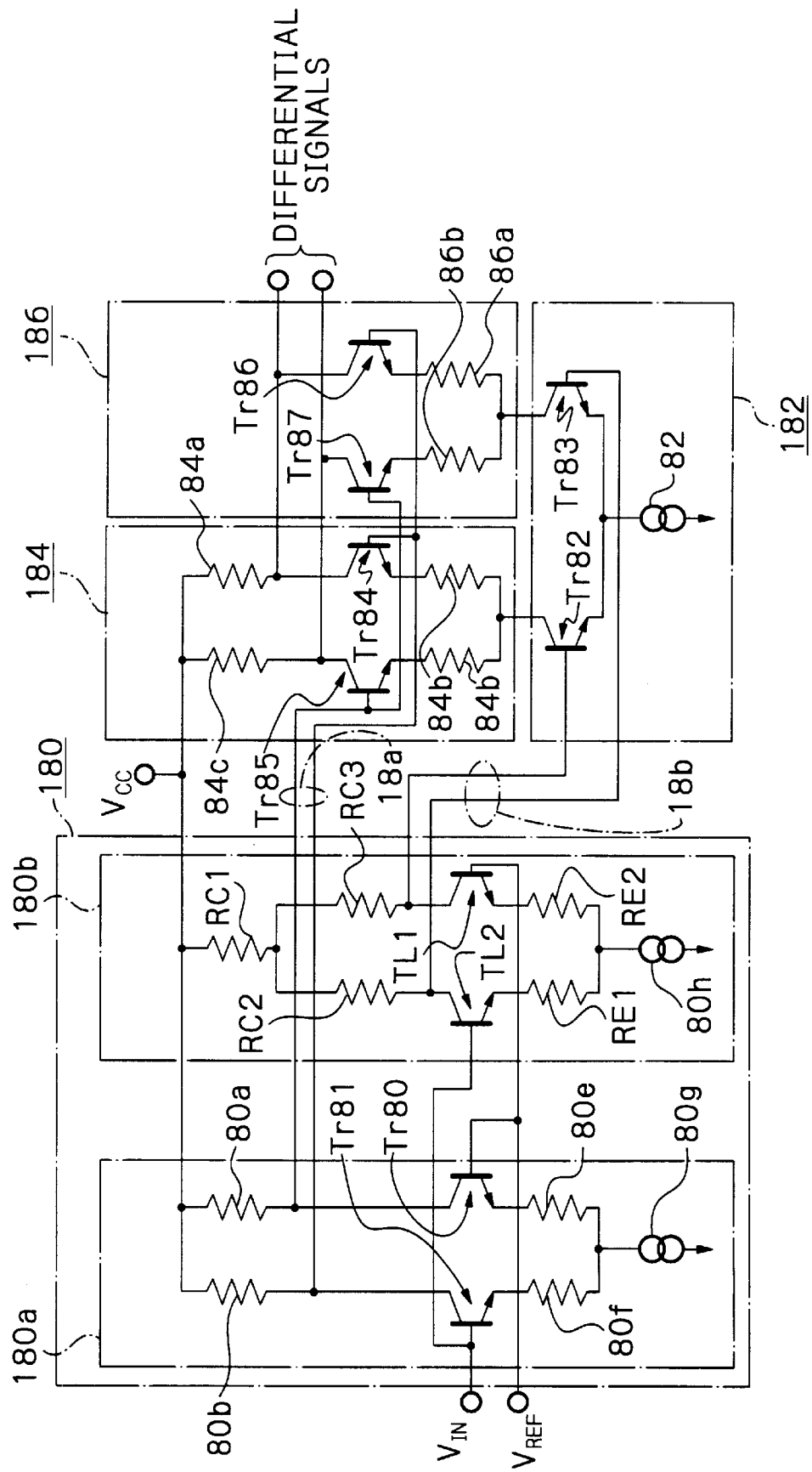
FIG. 7 is a circuit diagram showing a more specific configuration of the modification of FIG. 6.

FIGS. 6 and 7 show a first modification of the second embodiment which is an in-between of the first and second embodiments. Specifically, the variable-gain amplification 18 shown in FIG. 6 is closer to the first embodiment than to the second embodiment in that it does not include the level shift 181. As shown, the level shift 181 is replaced with a first input buffer 180a and a second input buffer 180b constituting the input buffer 180 in combination. The first input buffer 180a amplifies the level of signals to be fed to the differential amplifiers 184 and 186. The input buffer 180b amplifies the level of signals to be applied to the gain controller 182.

More specifically, as shown in FIG. 7, the input buffer 180a amplifies the first outputs 18a to be applied to the differential amplifiers 184 and 186. The input buffer 180b sets the shift of the DC level of the differential amplifiers 184 and 186 by using the input signals $V_{IN}$ and $V_{REF}$, and amplifies the second outputs 18b to be applied to the gain controller 182. The input buffer 180a is identical with, e.g., the input buffer 180, FIG. 2, except that the resistors 80c and 80d are omitted.

The input buffer 180b which is the characteristic feature of this modification includes a resistor RC1 connected at one end to the terminal $V_{cc}$ of the power supply line. The other end of the resistor RC1 is connected to one end of a resistor RC2 and one end of a resistor RC3. The other ends of the resistors RC2 and RC3 are connected to the collectors of transistors TL1 and TL2, respectively. The emitters of the transistors TL1 and TL2 are respectively connected to one end of a resistor RE1 and one end of a resistor RE2. The other ends of the resistors RE1 and RE2 are commonly connected to a constant current source 80h. The reference voltage V and input voltage $V_{IN}$ are applied to the bases of the transistors TL1 and TL2, respectively. A signal appearing at a junction between the resistor RC3 and the collector of the transistor TL1 is fed to the base of the transistor Tr82 of the gain controller 182. Also, a signal appearing at a junction between the resistor RC2 and the collector of the transistor TL2 is applied to the base of the transistor Tr83 of the gain controller 182.

The above configuration of the input buffer 180b determines the gain of the input signal on the basis of a ratio between the resistors RC2 and RC3 and the resistors RE1 and RE2. The DC (voltage) level is set at a level represented by a product of the resistor RC1 and the current to flow through the resistor RC1. The input buffer 180b shifts the voltage to and maintains it at a preselected level and feeds differential signals representative of a gain determined by the above resistors to the gain controller 182.

The gain controller 182 controls the gains of the differential amplifiers 184 and 186 by allocating the current $I_o$ flowing through the constant current source 82 to the amplifiers 184 and 186 in exactly the same manner as in the first embodiment. The modification is therefore capable of multiplying the amplitude of a signal by any desired gain and shifting the DC level in order to adjust the timing for varying the gain. This is successful to further enhance the freedom of bias and to set an adequate dynamic range. As a result, the modification is operable at a low voltage and therefore consumes a minimum of power. The modification is simple enough to be mounted on a single IC (Integrated Circuit) chip.

Figure 8:
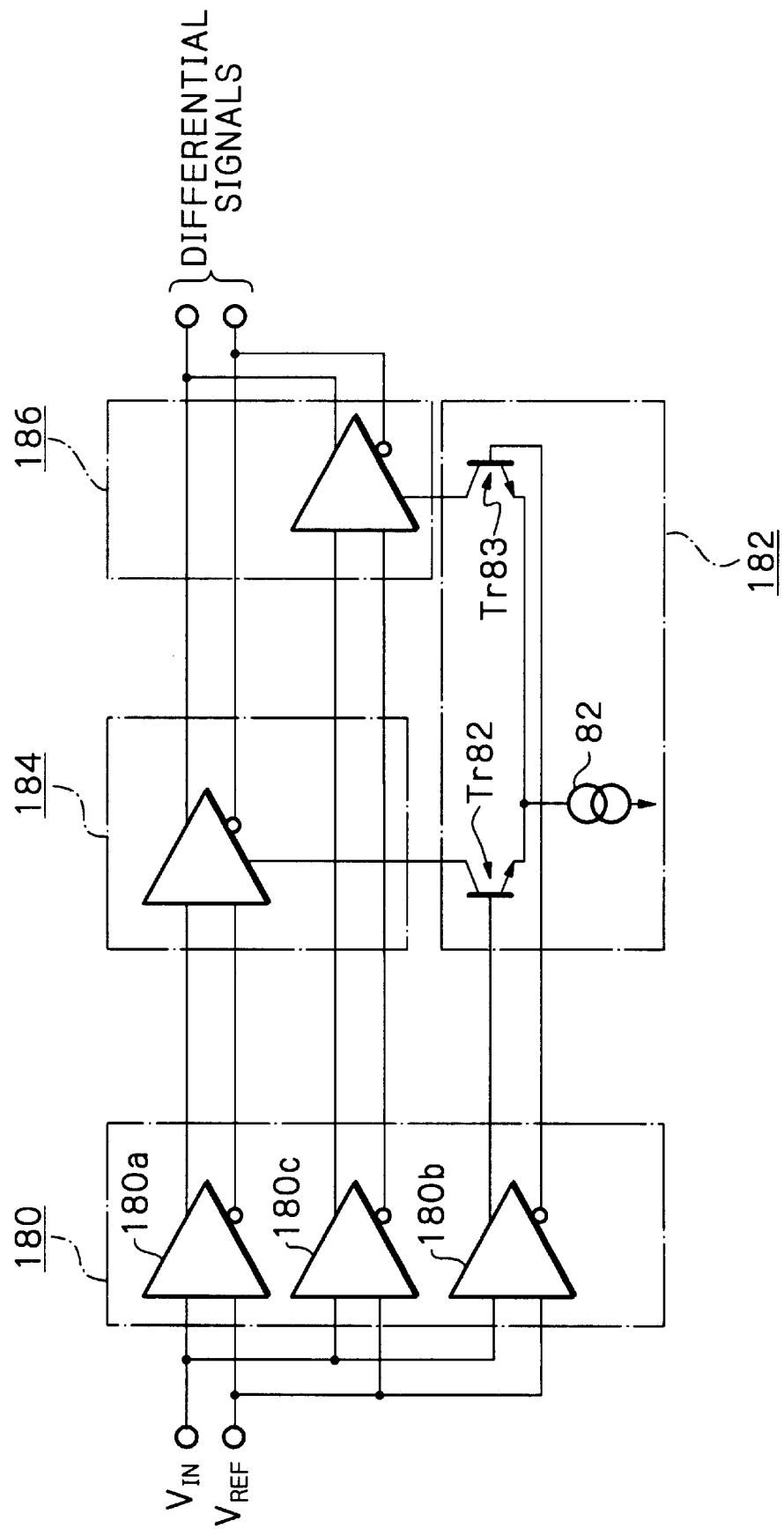
FIG. 8 is a schematic block diagram showing a second modification of the second embodiment.
Figure 9:
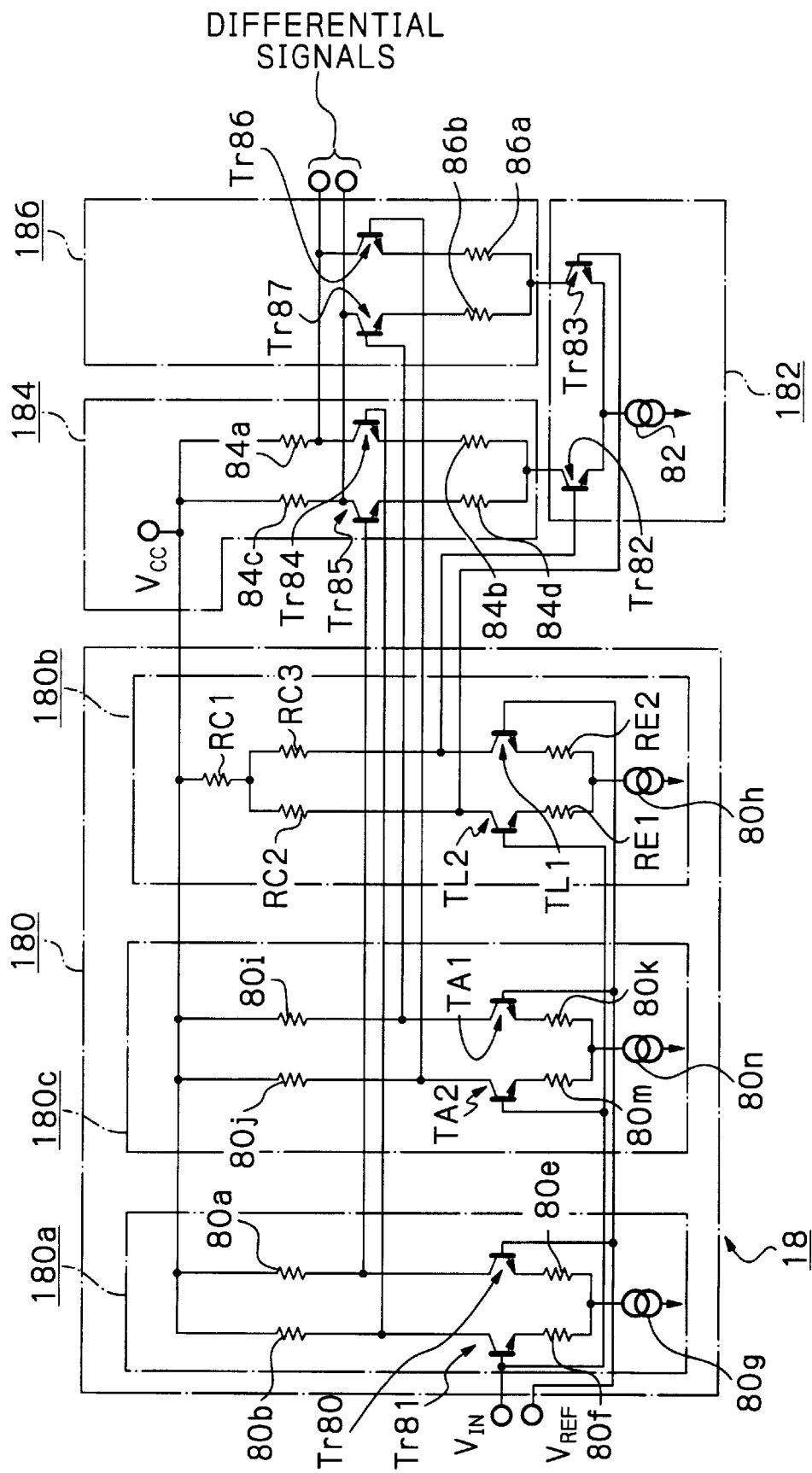
FIG. 9 is a circuit diagram showing a more specific configuration of the second modification.

FIGS. 8 and 9 show a second modification of the second embodiment. The second modification is similar to the first embodiment except for the following. As shown in FIG. 8, the variable-gain amplifying section 18 is made up of three input buffers 180a, 180b and 180c. The input buffers 180a and 180c are correspondingly connected to the differential amplifiers 184 and 186, respectively. The input buffer 180b feeds amplified signals to the gain controller 182. The additional input buffer 180c is identical with the input buffer 180 shown in FIG. 2 except that the resistors 80c and 80d are omitted.

More specifically, as shown in FIG. 9, the input buffer 180c has transistors TA2 and TA1, resistors 80i, 80j, 80k and 80m, and a constant current source 80n. The transistors 80i and 80j are respectively connected between the collectors of the transistors TA1 and TA2 and the power supply line. The resistors $80_k$ and $80_m$ are respectively connected to the emitter of the transistor TA1 and the emitter of the transistor TA2 at one end and are commonly connected to the constant current source 80n at the other end. The input voltage $V_{IN}$ and reference voltage $V_{REF}$ are respectively applied to the base of the transistor TA2 and the base of the transistor TA1. The gain of the input buffer 180c is determined by a ratio between the resistors 80i and 80j and the resistors 80k and 80m. A signal appearing at a junction between the resistor 80i and the collector of the transistor TA1 and a signal appearing at a junction between the resistor 80j and the collector of the transistor TA2 are input to the differential amplifier 186. The input buffer 180c is an amplifier having a higher gain than the input buffer 180a effecting wave shaping with a gain of less than 1.

When the input signal $V_{IN}$ has an extremely high level, it is passed through the input buffer 180a having any desired gain of less than 1. As a result, the level of the input signal $V_{IN}$ is so adjusted as to implement the operation within the linear range. If the input signal $V_{IN}$ has an extremely low level, then the input buffer 180c is caused to operate so as to guarantee a sufficient gain. The input buffers 180a and 180c deliver their differential outputs to the differential amplifiers 184 and 186, respectively. Therefore, the gain is essentially varied in accordance with the signals output from the input buffer 180c. The gain controller 182 variably controls the gain by allocating the total current $I_o$ to the differential amplifiers 184 and 186, as stated earlier.

For example, when the input signal has an extremely low level, the gain controller 182 allocates the current $I_o$ evenly to the differential amplifiers 184 and 186, i.e., $I_o/2$ to each of them. The current $I_o$ constantly flows through the constant current source 82. In this condition, the input buffer 180c and differential amplifier 186 constitute a high gain amplifier; the variable-gain amplifying section 18 sets a positive gain for the input signal. When the input signal has an extremely high level, the gain controller 182 allocates the entire current $I_o$ only to the differential amplifier 184. If the differential amplifier 184, like the input buffer 180a, is provided with a gain of less than 1 and constitutes a low gain amplifier together with the input buffer 180a and if the low gain amplifier is arranged to have a negative gain, then the above input signal can be attenuated to an adequate amplitude. This further broadens the dynamic range of the output signal.

Figure 10:
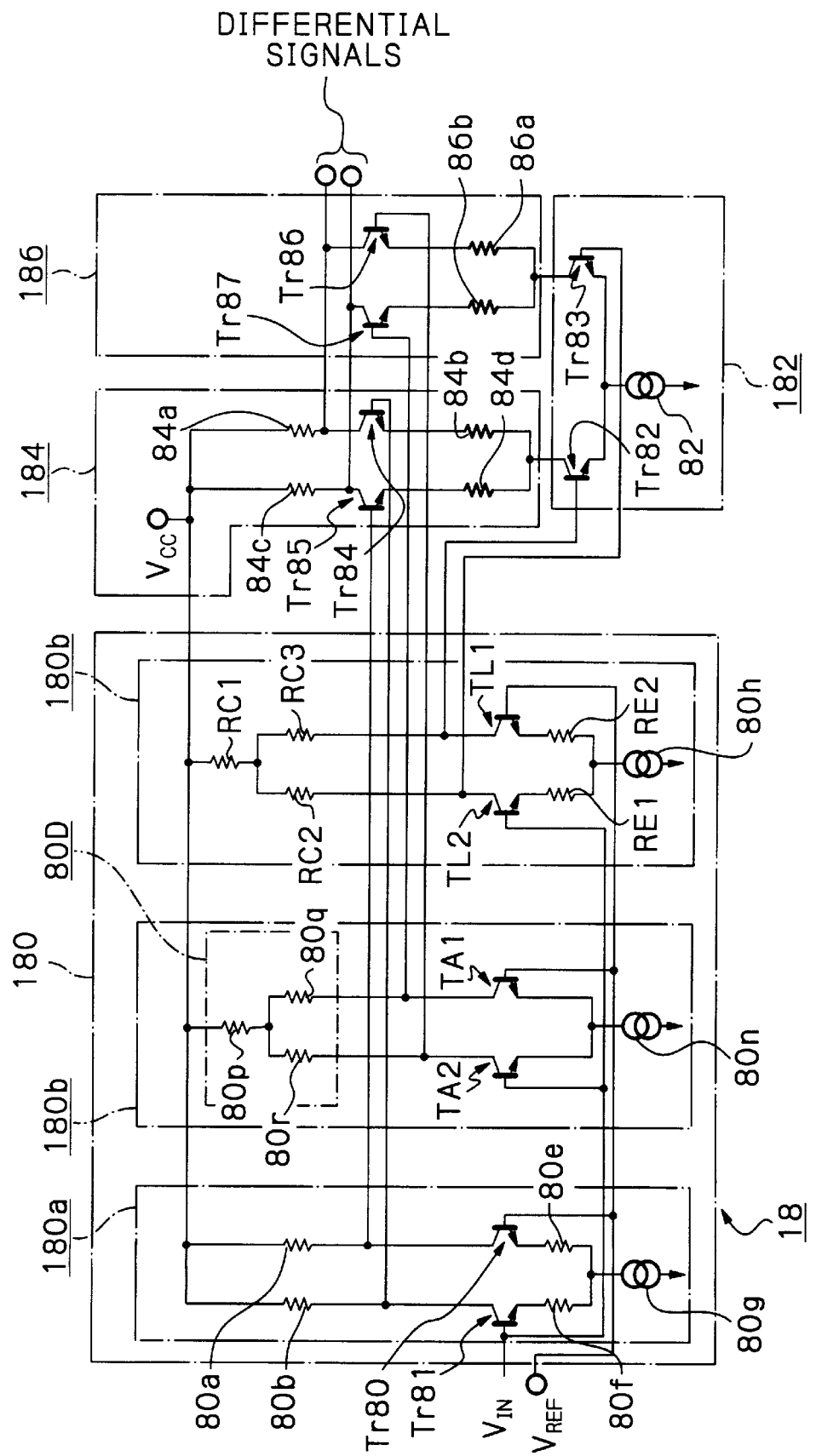
FIG. 10 is a schematic block diagram showing a third modification of the second embodiment.

A third modification of the second embodiment will be described with reference to FIG. 10. This modification is similar to the second modification except for the configuration of the input buffer 180c. As shown, the input buffer 180c does not include the transistors TA1 and TA2, FIG. 9, but includes an amplitude limiting circuit 80D. The amplitude limiting circuit 80D is connected between the power supply line and the collectors of the transistors TA1 and TA2 and made up of resistors 80p, 80q and 80r. In the specific modification, the resistor 80p is connected at one end to the power source line and at the other end to one end of the resistor 80q and one end of the resistor 80r. The other ends of the resistors 80q and 80r are connected to the collectors of the transistors TA1 and TA2, respectively. With this simple connection, it is possible to lower the voltage fed from the power source line and apply the lower voltage to the transistors TA1 and TA2. The lowered voltage reduces the total amplitude and thereby prevents needless signals to be amplified.

For example, when a signal having an extremely high level is incident to the light-sensitive device 12 of the optical receiver 10, ringing sometimes occurs in the output of the transimpedance amplification 14. The input signal with the ringing is input to the input buffer 180c also. Assume that the input buffer 180c is so constructed as to have a negative gain when the input signal is a (logical) ONE or have a positive gain when it is a (logical) ZERO. Then, even when the signal is a ZERO, the input buffer 180c amplifies the ringing component appearing at the edge portion. Should a signal be reproduced on the basis of the output of the optical receiver 10, a false signal would be generated despite the absence of a signal due to the amplified ringing component. The false signal would introduce, e.g., a bit error in a received burst signal.

Although the input buffer 180c has a high gain, the amplitude limiting circuit 80D is successful to limit the amplitude of the ringing component appeared at the preceding stage. It is therefore possible to obviate bit errors even with the output of the input buffer 180c and therefore to insure stable signal output.

Figure 11:
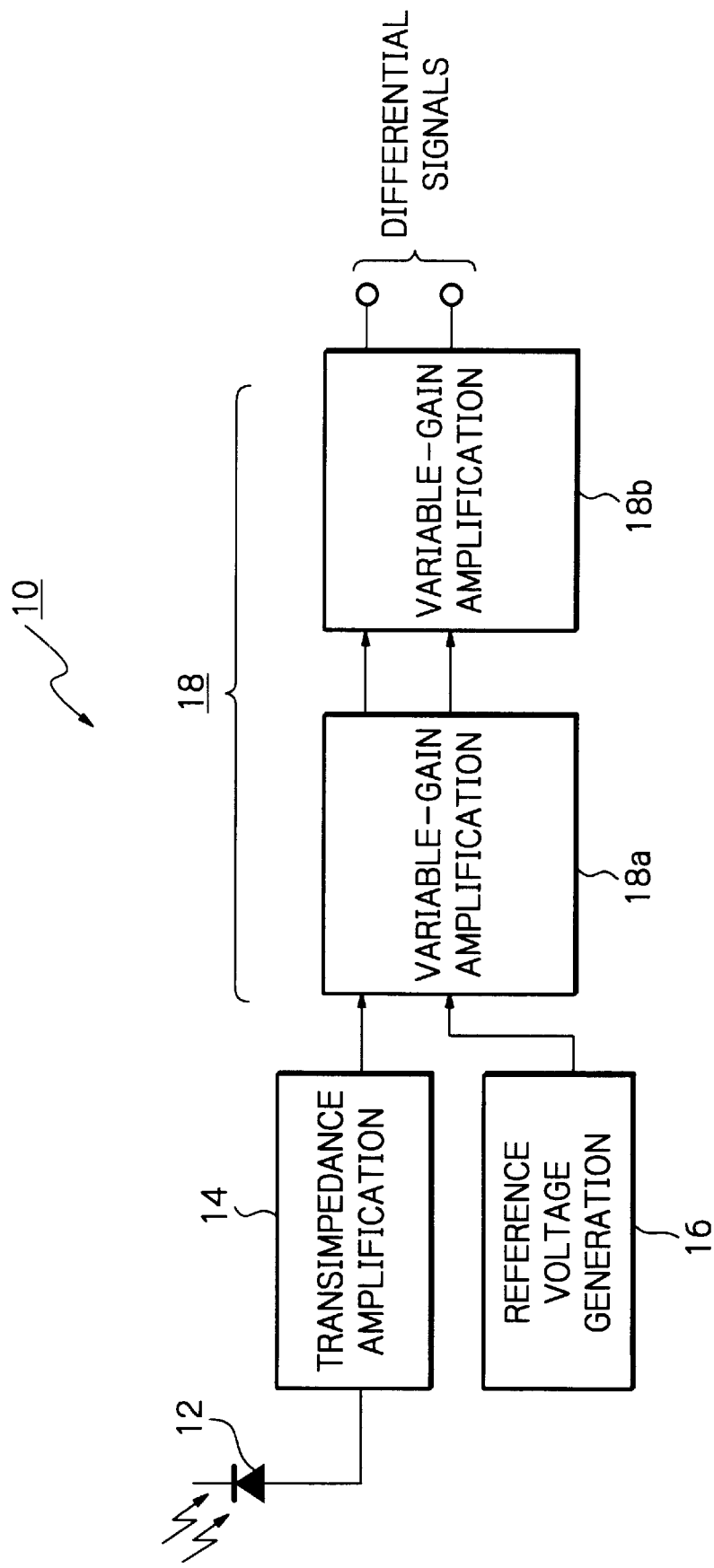
FIG. 11 is a schematic block diagram showing a fourth modification of the second embodiment.

FIG. 11 shows a fourth modification of the second embodiment. As shown, the variable-gain amplifying section 18 of the optical receiver 10 has a plurality of consecutive stages, e.g., two variable-gain amplifications 18a and 18b in the specific modification. The variable-gain amplifications 18a and 18b are cascaded, as illustrated. With this configuration, it is possible to reduce the gain of the individual stage and thereby amplify the input signal little by little. As a result, a signal waveform output in such a manner as to implement amplification in the linear range is free from distortions. This successfully enhances signal quality and further broadens the dynamic range. The variable-gain amplifications 18a and 18b may each be implemented by the circuitry of either one of the first and second embodiments.

Third Embodiment

Figure 12:
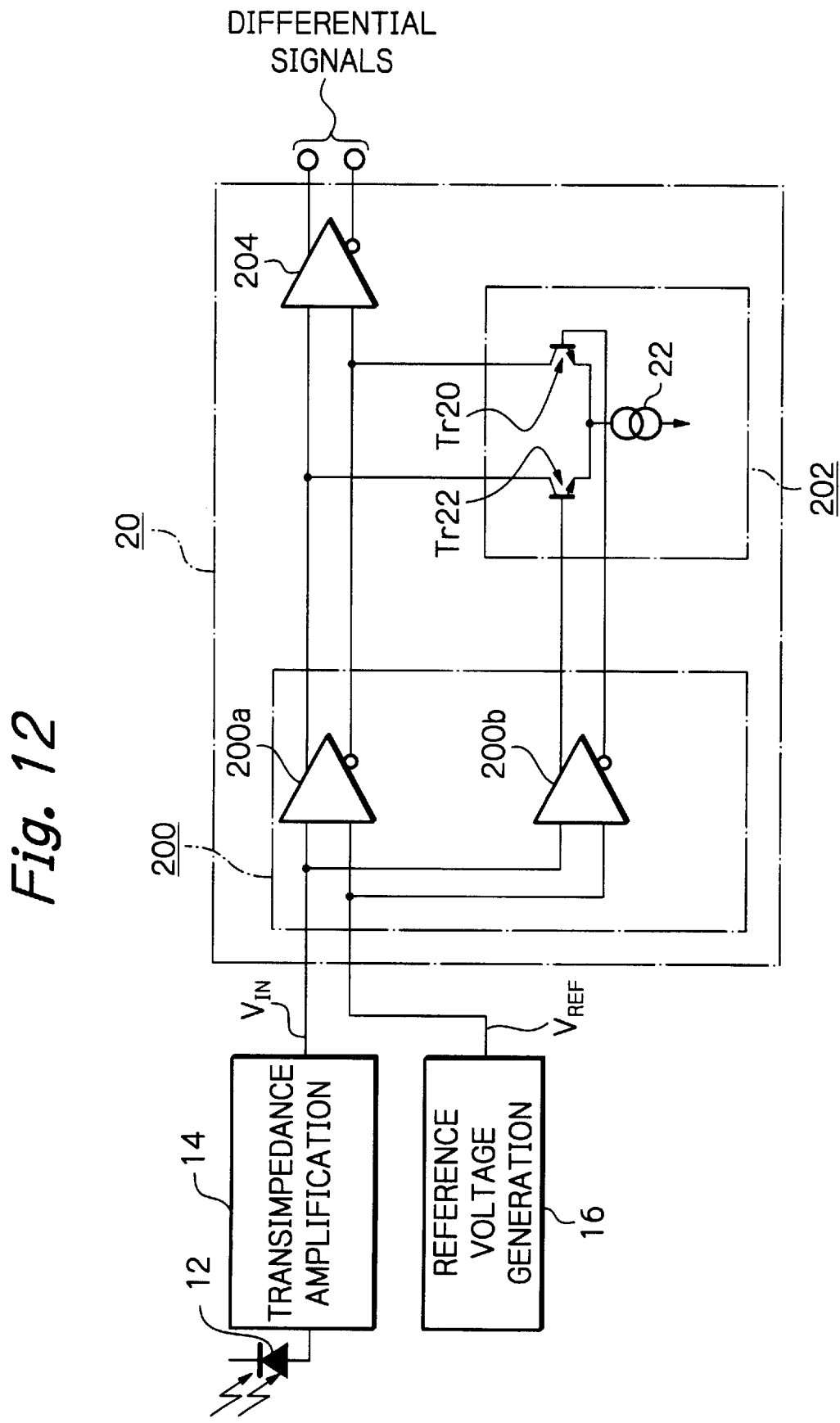
FIG. 12 is a schematic block diagram showing a third embodiment of the present invention.
Figure 13:
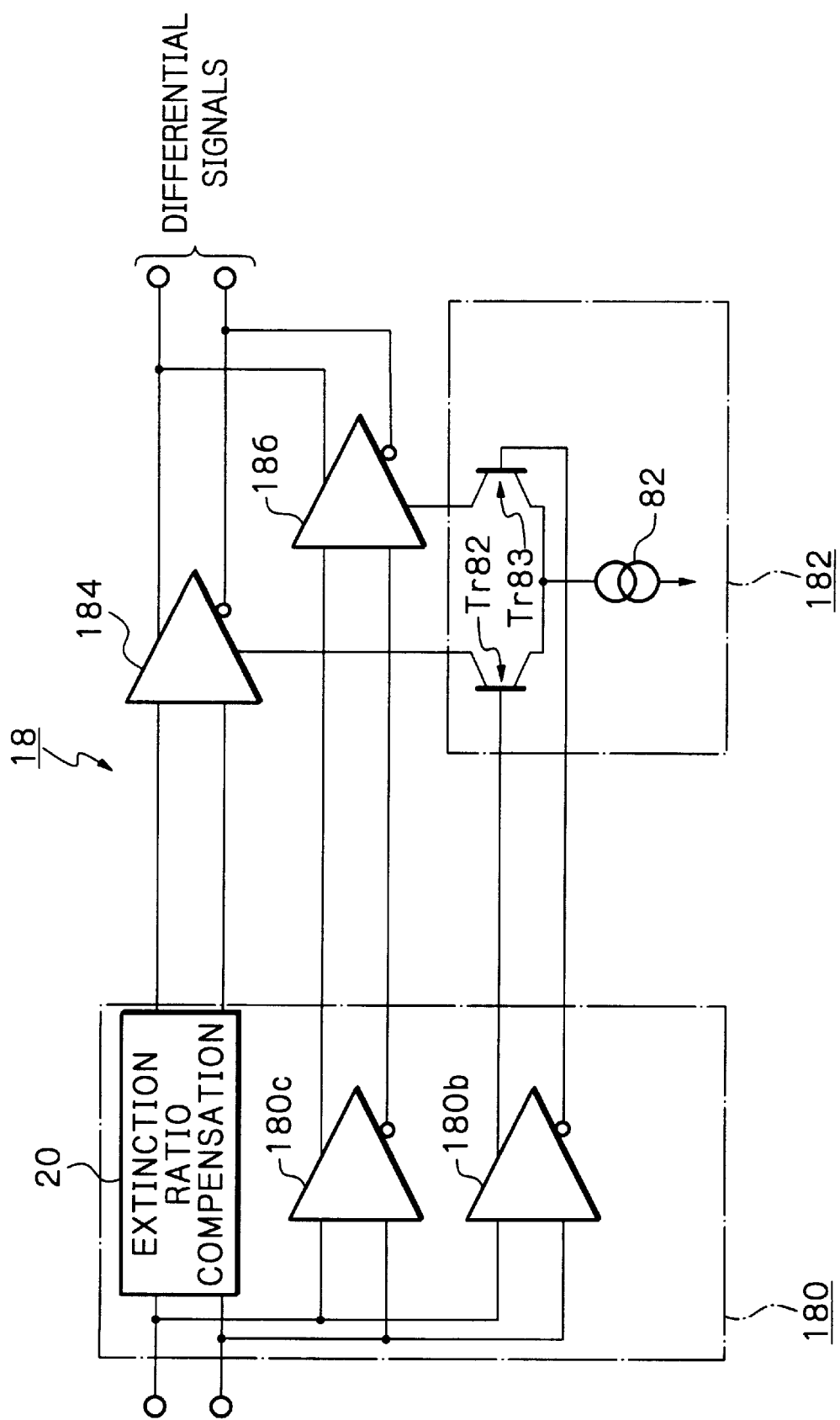
FIG. 13 is a schematic block diagram showing the second modification of the second embodiment partly replaced with a part of the third embodiment.

Reference will be made to FIGS. 12 and 13 for describing a third embodiment of the optical receiver in accordance with the present invention. This embodiment pays attention to the extinction ratio mentioned earlier, i.e., the ratio of the optical signal output $P_s$ to the optical signal output $P_b$. The optical receiver 10 receives an optical signal having an extinction ratio and therefore outputs an electric signal reflecting it. While an extinction ratio is usually so selected as not to effect transmission quality, it sometimes affects an optical signal, e.g., deteriorates the dynamic range in a low cost, simple optical communication system. The third embodiment is a solution to this problem.

The illustrative embodiment is similar to the second embodiment of FIG. 4 except that an extinction ratio compensating section 20 is substituted for the variable-gain amplifying section 18. The structural elements of this embodiment identical with those of the second embodiment are designated by like reference numerals and will not be described specifically in order to avoid redundancy.

As shown in FIG. 12, the extinction ratio compensating section 20 is generally made up of an input buffer circuit 200, a current bypass circuit 202, and a differential amplifier 204. The input buffer circuit 200 has two input buffers 200a and 200b for producing differential signals from the signals $V_{IN}$ and $V_{REF}$ input thereto. Specifically, the input buffer circuit 200, like the input buffer 180a, is provided with a gain of less than 1 so as to implement linear operation even when the input signal $V_{IN}$ has an extremely high level. A potential difference between the signals $V_{IN}$ and $V_{REF}$, i.e., an input offset input to the input buffer section 200 reflects the extinction ratio of the signal $V_{IN}$. The input buffers 200a and 200b feed amplified signals to the differential amplifier 204 and current bypass circuit 202, respectively.

The current bypass circuit 202 has two transistors Tr20 and Tr22 and a constant current course 22. The collector of the transistor Tr22 is connected to a signal line to which the input buffer 200a outputs a signal identical in phase with the input signal. The collector of the transistor Tr20 is connected to a signal line to which the input buffer 200a outputs a signal opposite in phase to the input signal. The emitters of the transistors Tr20 and Tr22 are commonly connected to the constant current source 22. The input buffer 200b delivers to the bases of the transistors Tr20 and Tr22 a signal of inverted phase and a signal of non-inverted phase, respectively, as bypass signals. The outputs of the input buffer 200a are input to the transistors Tr20 and Tr22 in accordance with the level of the input signal, causing currents flowing through the transistors Tr20 and Tr22 to vary. The current bypass circuit 202 therefore shifts the DC (voltage) level of signals output from the input buffer circuit 200, as will be described more specifically later. The differential amplifier 204 amplifies signals input thereto.

In operation, the transimpedance amplification 14 transforms a current output form the light-sensitive device 12 to a voltage or input signal $V_{IN}$. The input signal $V_{IN}$ is input to the extinction ratio compensating section 20 together with the reference signal $V_{REF}$ output from the reference voltage generation 16. The signals $V_{IN}$ and $V_{REF}$ each are applied to the input buffers 200a and 200b. The input buffers 200a and 200b should preferably have the same gain of less than 1. Should one of the two gains be far greater than the other gain, the amplitude of the non-inverted phase and that of the inverted phase would not be symmetrical and would appear as a distortion in the resulting signal level. The distortion is apt to give rise to problems in the processing to follow. In this manner, the gain of the input buffers 200a and 200b should preferably be variable, depending on the application.

The input buffer 200a delivers its differential signals to the differential amplifier 204 and current bypass circuit 202. When the input signal $V_{IN}$ is weak or absent, the outputs of the input buffers 200a and 200b are substantially balanced with each other and fed to the associated circuits shown in FIG. 12. In the current bypass circuit 202, the transistors Tr20 and Tr22 are driven by the signals fed from the input buffer 200b to their bases. At this instant, the transistors Tr20 and Tr22 allow the currents output form the input buffer 200a to flow evenly in a balanced condition therethrough. Therefore, the signal of non-inverted phase and the signal of inverted phase are fed to the differential amplifier 204 with their DC offset adequately suppressed (compensation of an extinction ratio). The differential amplifier 204 amplifies the input differential signals, as stated earlier. By so amplifying the signal level while suppressing the DC offset, it is possible to compensate for the extinction ratio and thereby broaden the dynamic range of a weak input signal.

Assume that the input signal $V_{IN}$ has an extremely high level or a great extinction ratio. Then, the voltages applied to the inputs of each of the input buffers 200a and 200b have a difference representative of a high offset voltage. As a result, the input buffers 200a and 200b each operate such that the signal voltage of inverted phase rise while the signal voltage of non-inverted phase drop. At this instant, the current bypass circuit 202 allows only a current derived from the inverted output of the input buffer 200a to flow through the transistor Tr20, i.e., bypasses the current. Consequently, the DC voltage of the inverted phase is shifted to the low side. The differential amplifier 204 amplifies the asymmetrical non-inverted and inverted differential signals input thereto. The input signal $V_{IN}$ is therefore linearly amplified without regard to its level and has its dynamic range broadened.

If desired, a plurality of extinction ratio compensating sections 20 may be cascaded for stably outputting a signal having a desirable waveform and a broad dynamic range.

As shown in FIG. 13, the extinction ratio compensating section 20 may be substituted for the input buffer 180a of the variable-gain amplifying section 18 included in the circuitry described with reference to FIG. 8. In FIG. 13, the structural elements identical with the structural elements shown in FIG. 8 are designated by like reference numerals and will not be described specifically in order to avoid redundancy.

As shown in FIG. 13, in the variable-gain amplifying section 18, the input buffer circuit 180 receives the input signals $V_{IN}$ and $V_{REF}$. The input signals $V_{IN}$ and $V_{REF}$ are fed to each of the extinction ratio compensating section (extinction ratio compensation hereinafter) 20 and input buffers 180b and 180c. The extinction ratio compensation 20 linearly amplifies the input signal $V_{IN}$ without regard to the level of the signal $V_{IN}$, i.e., even when the level is excessively high, as stated with reference to FIG. 12. At this instant, with the current bypass circuit 202 shown in FIG. 12, the compensation 20 suppresses the undesirable rise of the DC voltage and thereby improves the extinction ratio. Consequently, a signal linearly amplified without regard to the level of the input signal $V_{IN}$ is input to the differential amplifier 184.

In FIG. 13, the input buffer 180c amplifies the input signal $V_{IN}$ with a high gain and feeds the resulting differential signals to the differential amplifier 186. On the other hand, the input buffer 180b amplifies the input signal $V_{IN}$ with any desired gain and feeds the resulting differential signals to the gain controller 182 as a bias. The gain controller 182 control currents to flow through the transistors Tr82 and Tr83 in accordance with the level of the original input signal $V_{IN}$. For example, the gain controller 182 sets up a positive gain by allocating the current evenly to the differential amplifiers 184 and 186 or sets up a negative gain by allocating the entire current to the differential amplifier 184.

Even when the input signal $V_{IN}$ has an extremely low level or an extremely high level or has an extinction ratio, the circuitry shown in FIG. 13 is capable of adequately amplifying the signal $V_{IN}$ to thereby output a signal easy to handle. The circuitry can therefore be easily interfaced to circuitry to follow without resorting to any extra arrangement. To further enhance the quality of the output signal, a plurality of circuitry shown in FIG. 13 may be cascaded.

Fourth Embodiment

Figure 14:
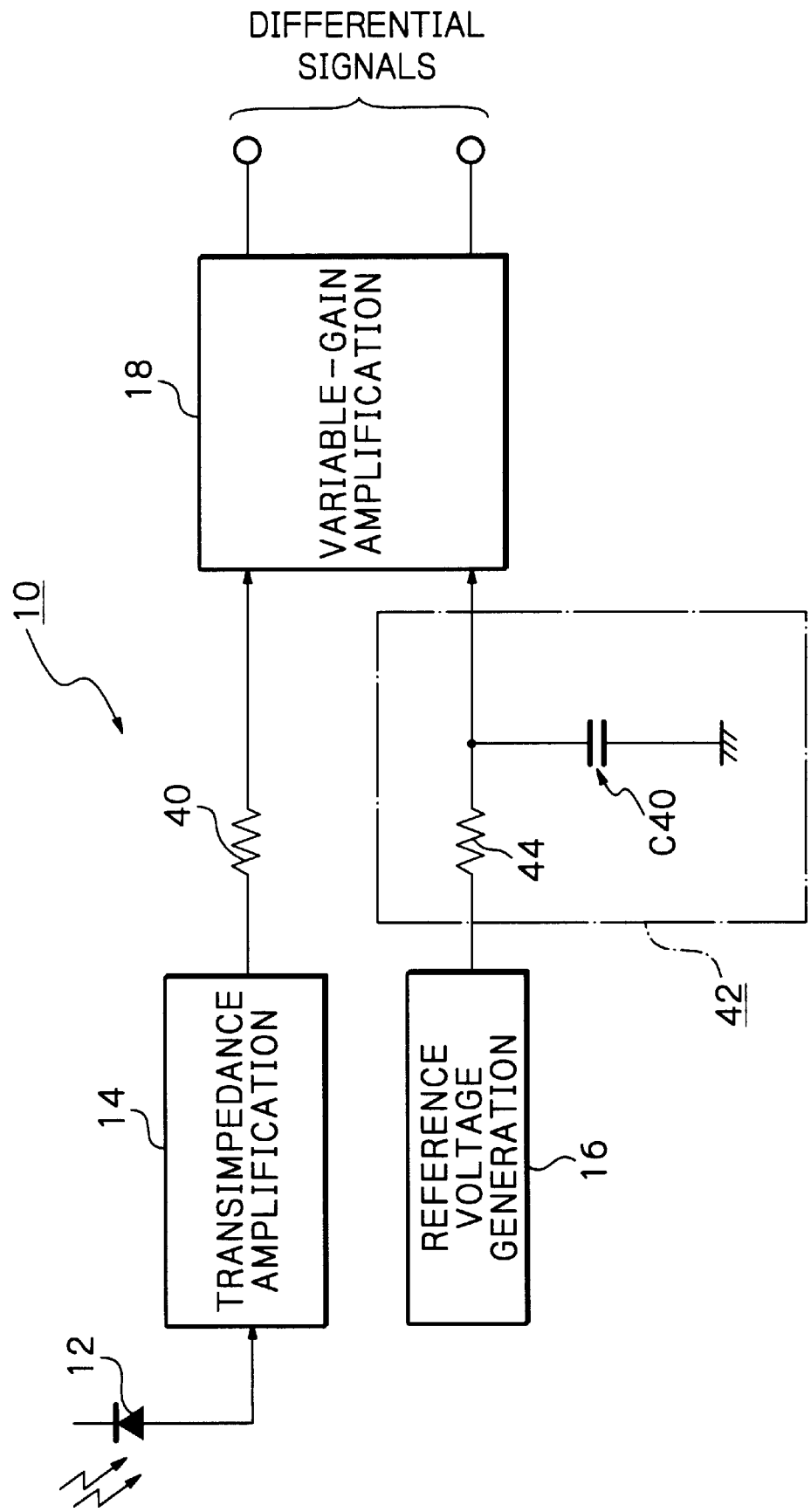
FIG. 14 is a schematic block diagram showing a fourth embodiment of the present invention.

A fourth embodiment of the present invention will be described with reference to FIG. 14. As shown, the optical receiver 10 has a resistor 40 and a low pass filter (LPF) 42 in addition to the light-sensitive device 12, transimpedance amplification 14, reference voltage generation 16, and variable-gain amplification 18. The resistor 40 is connected between the transimpedance amplification 14 and the variable-gain amplification 18. The LPF 42 is connected between the reference voltage generation 16 and the variable-gain amplification 18. In the illustrative embodiment, the LPF 42 has the most simple configuration implemented only by a resistor 44 and a capacitor C40. The resistor 40 makes up for the drop of the reference signal $V_{REF}$ ascribable to a current fed to the resistor 44 of the LPF 42 and variable-gain amplification 18.

The operation of the illustrative embodiment is as follows. Generally, the optical receiver 10 transforms a received optical signal to a voltage signal and then amplifies a signal input to the variable-gain amplification 18. The optical receiver 10 has sensitivity generally determined by a noise current in terms of an input. The noise current in terms of an input refers to the amount of noise components contained in the currents fed from the transimpedance amplification 14 and reference voltage generation 16 including an identical configuration to the variable-gain amplification 18. To calculate the noise current in terms of an input, noise currents included in the above currents each are squared and then averaged, and the resulting mean squares are summed.

To improve the sensitivity of the optical receiver 10, it is necessary to reduce the noise current contained in the reference signal $V_{REF}$. When the reference signal $V_{REF}$ is fed from the reference signal generation 16 to the variable-gain amplification 18 via the LPF 42, the LPF 42 reduces a noise component contained in the signal $V_{REF}$ before it is input to the amplification 18. It is therefore possible to reduce the noise current represented by the sum of the mean squares mentioned above. Particularly, by suppressing either one of the two inputs, it is possible to further promote the reduction of the noise current, i.e., to further enhance the sensitivity of the optical receiver 10.

While the embodiments shown and described each are implemented as an optical receiver, the present invention is capable of providing even a receiver expected to receive an electric signal with adaptability to burst signals, a broad dynamic range, high transmission quality, and high sensitivity.

In summary, it will be seen that the present invention provides an optical receiver guaranteeing the dynamic range of a signal, adaptive even to burst signals, and insuring high signal quality and high sensitivity.

The entire disclosure of Japanese patent application No. 161892/1998 filed Jun. 10, 1998 including the specification, claims, accompanying drawings and abstract of the disclosure is incorporated herein by reference in its entirely.

While the present invention has been described with reference to the illustrative embodiments, it is not to be restricted by the embodiments. It is to be appreciated that those skilled in the art can change or modify the embodiments without departing from the scope and spirit of the present invention.

What is claimed is:

1. A receiver comprising:

a first amplifying circuit for amplifying an input signal to thereby output an amplified input signal;

a reference voltage generating circuit including a same configuration as said first amplifying circuit for generating a reference signal having a reference voltage for said amplified input signal; and a variable-gain amplifying circuit for variably adjusting a gain of a level of a signal derived from said amplified input signal and said reference signal;

said variable-gain amplifying circuit comprising:

a second amplifying circuit for amplifying said amplified input signal and said reference signal for maintaining linearity to thereby output a pair of first differential signals and a pair of second differential signals having shifted levels;

a first differential amplifier for performing differential amplification based on said pair of first differential signals;

a second differential amplifier for performing differential amplification based on said pair of first differential signals with a higher gain than said first differential amplifier; and a gain controller for controlling, based on said pair of second differential signals, the gain of said first differential amplifier and the gain of said second differential amplifier with a control signal capable of varying a gain allocation to said first differential amplifier and said second differential amplifier;

said gain controller causing, when said amplified input signal has an amplitude far greater than an amplitude of said reference signal, a current to flow through only one of said first differential amplifier and said second differential amplifier or causing, when said amplified input signal has an amplitude far smaller than the amplitude of said reference signal, said first differential amplifier and said second differential amplifier to operate at the same time.

2. A receiver as claimed in claim 1, wherein when the input signal is an optical signal, said first amplifying circuit includes a photoelectric transducer at a preceding stage thereof for transforming said optical signal to an electric signal and converts said electric signal to a voltage signal.

3. A receiver comprising:
a first amplifying circuit for amplifying an input signal to thereby output an amplified input signal;
a reference voltage generating circuit including a same configuration as said first amplifying circuit for generating a reference signal having a reference voltage for said amplified input signal; and
a variable-gain amplifying circuit for variably adjusting a gain of a level of a signal derived from said amplified input signal and said reference signal;
said variable-gain amplifying circuit comprising:
a second amplifying circuit for amplifying said amplified input signal and said reference signal for maintaining linearity to thereby output a pair of first differential signals;
a first differential amplifier for performing differential amplification based on said pair of first differential signals;
a second differential amplifier for performing differential amplification based on said pair of first differential signals with a higher gain than said first differential amplifier;
a level shifting circuit for setting a shift of a DC level by using said first pair of differential signals to thereby output a pair of second differential signals; and
a gain controller for controlling, based on said pair of second differential signals, the gain of said first differential amplifier and the gain of said second differential amplifier with a control signal capable of varying a gain allocation to said first differential amplifier and said second differential amplifier;
said gain controller causing, when said amplified input signal has an amplitude far greater than an amplitude said reference signal, a current to flow through only one of said first differential amplifier and said second differential amplifier or causing, when said amplified input signal has an amplitude far smaller than an amplitude said reference signal, said first differential amplifier and said second differential amplifier to operate at the same time.

4. A receiver as claimed in claim 3, wherein said gain controller includes a third differential amplifier comprising a first and a second transistor respectively connected to said first differential amplifier and said second differential amplifier, said first transistor and said second transistor having emitters thereof connected to each other.

5. A receiver as claimed in claim 3, wherein said level shifting circuit outputs said pair of first differential signals via an emitter follower circuit.

6. A receiver as claimed in claim 3, wherein said variable-gain amplifying circuit comprises a plurality of cascaded variable-gain amplifying circuits.

7. A receiver as claimed in claim 3, wherein said second amplifying circuit comprises a plurality of amplifying circuits each for amplifying levels of a plurality of input signals for a particular destination to thereby output a pair of differential signals having a positive gain and a negative gain, respectively;
said plurality of amplifying circuits each comprising:
a pre-amplifier for amplifying levels of signals to be fed to at least one of said first differential amplifier and said second differential amplifier; and
a drive signal generator for generating, when said level shifting circuit is arranged in said gain controller, a variable gain drive signal based on the differential signals.

8. A receiver as claimed in claim 7, wherein said pre-amplifier comprises:
a first pre-amplifier for amplifying levels of signals to be fed to said first differential amplifier; and
a second pre-amplifier for amplifying levels of signals to be fed to said second differential amplifier.

9. A receiver as claimed in claim 3, wherein said variable-gain amplifying circuit comprises:
a pre-amplifier for amplifying levels of signals to be fed to at least one of said first differential amplifier and said second differential amplifier; and
a drive signal generator for generating, when said level shifting circuit is arranged in said gain controller, a variable gain drive signal based on the differential signals;
said variable-gain amplifying circuit comprising a plurality of cascaded variable-gain amplifying circuits.

10. A receiver as claimed in claim 7, wherein said second amplifying circuit further comprises an amplitude limiting circuit for reducing ringing contained in an output signal of one of said plurality of amplifiers for amplifying the levels of the signals to be fed to said second differential amplifier.

11. A receiver as claimed in claim 7, wherein said variable-gain amplifying circuit comprises:
a current bypass circuit for pulling in, when compensating for an extinction ratio represented by a ratio in signal level derived from an intensity of a received input signal, a current fed from said pre-amplifier in accordance with a difference in level between drive signals representative of a DC level shift appearing in differential input signals output from a drive signal amplifying circuit included in said second amplifying circuit; and
a differential amplifier for amplifying an output of said pre-amplifier;
said current bypass circuit causing, when said amplified input signal has an amplitude far greater than an amplitude of said reference signal, a current to flow through only one of said first differential amplifier and said second differential amplifier or causing, when said amplified input signal has an amplitude far smaller than an amplitude of said reference signal, said first differential amplifier and said second differential amplifier to operate at the same time.

12. A receiver as claimed in claim 11, wherein said variable-gain amplifying circuit further comprises a compensating circuit for compensating for an extinction ratio at a stage preceding said first differential amplifier.

13. A receiver as claimed in claim 3, wherein when the input signal is an optical signal, said first amplifying circuit includes a photoelectric transducer at a preceding stage thereof for transforming said optical signal to an electric signal and converts said electric signal to a voltage signal.

* * * * *